United States Patent [19]

Kishida et al.

[11] Patent Number: 4,472,739
[45] Date of Patent: Sep. 18, 1984

[54] AGC SYSTEM FOR A TELEVISION RECEIVER

[75] Inventors: Toshio Kishida; Kenji Arima; Kunihiro Yoshizawa; Hiroshi Igarashi, all of Tokyo, Japan

[73] Assignee: Clarion Co., Ltd., Tokyo, Japan

[21] Appl. No.: 398,009

[22] Filed: Jul. 14, 1982

[30] Foreign Application Priority Data

Jul. 21, 1981 [JP]  Japan .................................. 56-114179

[51] Int. Cl.³ .............................................. H04N 5/52
[52] U.S. Cl. .................................................. 358/178
[58] Field of Search ...................... 358/178, 175, 176; 455/200, 242, 246, 247, 251; 330/134, 279

[56] References Cited

U.S. PATENT DOCUMENTS 4,213,151  7/1980  Harford ............................... 358/178

*Primary Examiner*—John C. Martin
*Assistant Examiner*—Jeffrey Sutherland
*Attorney, Agent, or Firm*—Flynn, Thiel, Boutell & Tanis

[57] ABSTRACT

AGC system for a television receiver having a keyed AGC circuit, a peak or average AGC circuit and a switching circuit between a video signal intermediate frequency amplifier circuit and an video signal detection circuit, wherein automatic gain control (AGC) for video signals is effected by the keyed AGC circuit, which is commuted by using the switching circuit after having had the peak or average AGC circuit operated at the switch-on moment of the power supply.

2 Claims, 3 Drawing Figures

4,472,739

AGC SYSTEM FOR A TELEVISION RECEIVER

BACKGROUND OF THE INVENTION

The present invention relates to an AGC system for a television receiver, particularly to an ameliorated AGC system having a shortened stabilization time for video signals at the time of the rise of the source voltage so that television video signals are rapidly treated.

A conventional AGC system utilizing a clamp pulse used in a decoder for a television receiver in a wire television system has a disadvantage that video signals are disturbed at the time of the rise of the source voltage, because the AGC voltage is not maintained at a predetermined value. Moreover it takes a long time before coded signals superposed on video signals can be treated.

OBJECT OF THE INVENTION

It is an object of the present invention to obviate such a disadvantage of the conventional AGC system.

SUMMARY OF THE INVENTION

In order to attain this object the present invention is characterized in that, for automatic gain control for the video signals, a television receiver is provided with a keyed AGC means and an average or peak AGC means, and is so constructed that the keyed AGC means is commuted, after having had the average or peak AGC means operated, in order to shorten the stabilization time for the video signals.

DESCRIPTION OF PREFERRED EMBODIMENT

Figure 1:
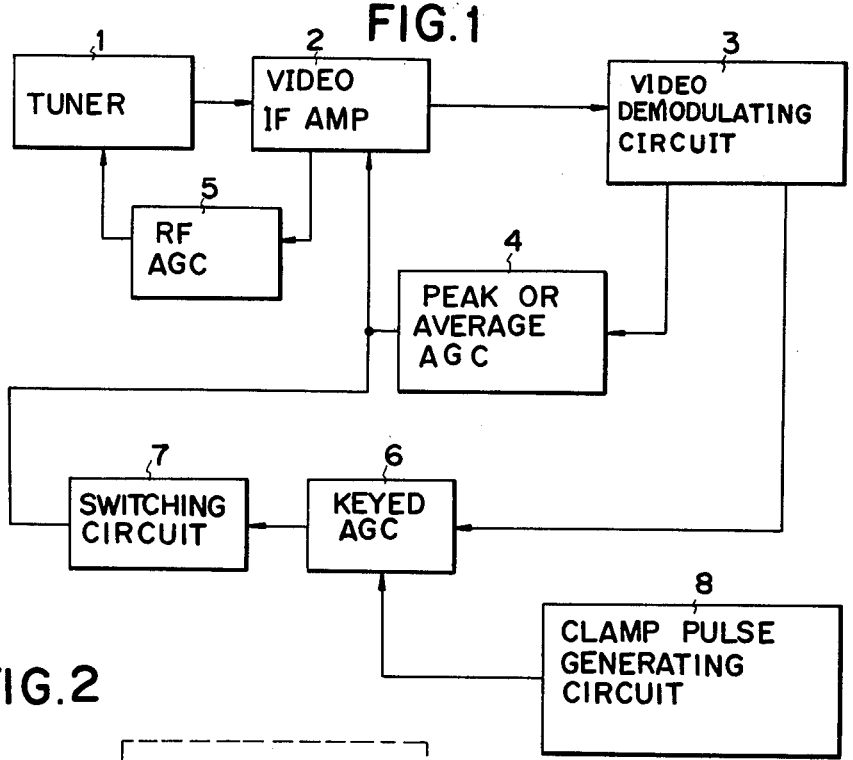
FIG. 1 is a block diagram representing an embodiment of this invention.

FIG. 1 shows an embodiment, where this invention is applied to the AGC system part of the decoder circuit for decoding coded television signals in a television receiver for a wire television system, for which television signals are coded and transmitted.

In the figure, reference numeral 1 is a tuner circuit; 2 is an video signal intermediate frequency amplifier circuit; 3 is an video signal demodulating circuit; 4 is a peak or average AGC circuit; 5 is a high frequency AGC circuit; 6 is a keyed AGC circuit; 7 is a switching circuit; and 8 is a clamp pulse generating circuit.

The clamp pulses coming from the circuit 8 are supplied to the keyed AGC circuit 6 and used as gate strobing pulses for it. At this time, timing is determined referring to horizontal and vertical synchronization signals of video signals. Therefore, if the system is operated only by the keyed AGC as in the prior art technique, it is necessary to stabilize at first video signals. That is, timing between video signals and said gate clamp pulses is in question.

In order to resolve this problem, according to this invention, a switching circuit 7 is disposed between the outputs of the keyed AGC circuit 6 and the peak or average AGC circuit 4, and AGC supplied to the video signal intermediate frequency amplifier circuit 2 depending upon video, signals coming from the video signal demodulating circuit 3 is effected at first by the peak or average AGC circuit 4 and then by commuting it to the keyed AGC circuit 6, so that response speed of the whole AGC is increased. The peak or average AGC circuit 4 detects the level of video signals demodulated by the video signal demodulating circuit 3 and supplies suitable AGC potential, which corresponds well to the thus demodulated level, to the video signal intermediate frequency amplifier circuit 2 so that its output level is stabilized.

Figure 2:
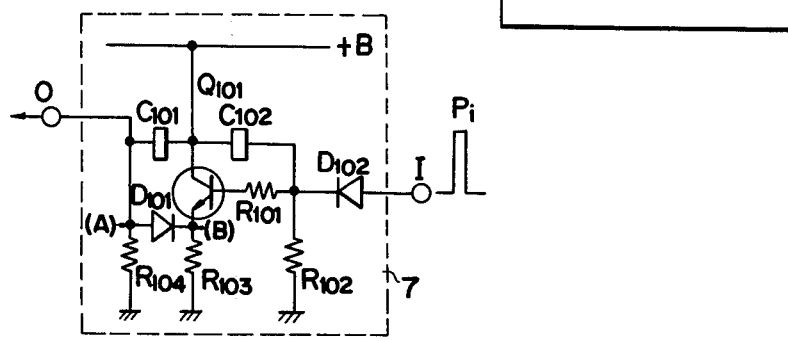
FIG. 2 is a circuit diagram showing an example of the switching circuit used for the embodiment shown in FIG. 1.

FIG. 2 is a circuit diagram showing an example of the switching circuit used for said commutation of AGC. In the figure, $Q_{101}$ is an emitter follower transistor; $D_{101}$ and $D_{102}$ are diodes; $C_{101}$ and $C_{102}$ are condensers; $R_{101}$ to $R_{104}$ are resistances; I is an input terminal; and O is an output terminal. Input pulses $P_i$ coming from the keyed AGC circuit 6 are supplied to the input terminal I and the AGC potential for the video signal intermediate frequency amplifier circuit 2 appears at the output terminal O.

In the switching circuit shown in FIG. 2, when the source is switched-on, potential at A rises at first almost up to the source voltage $+B$ by the condenser $C_{101}$ and the resistance $R_{104}$ (which constitute a filter constant for the peak or average AGC) and then, when the video signal demodulating circuit 3 outputs a demodulated video signal, it is set at a predetermined potential by the peak or average AGC circuit 4. Accordingly, at this time, output level of video signals is constant at the AGC potential mentioned above, as shown by a straight line a in FIG. 3. (However, in this case, in this working region of AGC (hatched region in FIG. 3), the output level of video signals controlled by the peak or average AGC circuit 4 is higher than that controlled by the keyed AGC circuit 6.)

On the other hand, potential at B in FIG. 2 is a potential which the keyed AGC circuit 6 obtains by gate processing the video signals coming from the video signal demodulating circuit 3 referring to a clamp pulse coming from the clamp pulse generating circuit 8. That is, when the source is switched-on, the keyed AGC circuit 6 detects that the clamp pulse is in synchronism with the horizontal synchronization pulse of the video signals, and the transistor $Q_{101}$ becomes conductive by the input pulse $P_i$ supplied to the input terminal I by said circuit. Potential at B rises up to a potential level, which is equal to source voltage minus base-emitter potential $V_{BE}$ of the transistor $Q_{101}$ ($+B-V_{BE}$), and then decreases gradually.

On the other hand, the points A and B are connected through the diode $D_{101}$.

Figure 3:
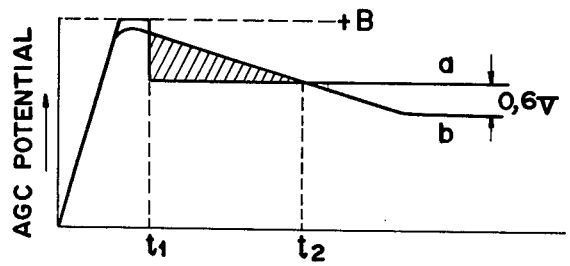
FIG. 3 is a characteristic diagram for explaining the working manner of the circuit shown in FIG. 2.

Consequently, since the moment when the source is switched-on (except for about 100 m sec until $t_1$ in FIG. 3), as the diode $D_{101}$ is non-conductive, AGC of the video signal intermediate frequency amplifier circuit 2 is effected by said potential at A, that is, by output of the peak or average AGC 4, and the period of time necessary for stabilization of video signals is very short, e.g. about 100 m sec till $t_1$ in FIG. 3. After that, when potential at B becomes lower than that at A by more than about 0.6V, as the diode $D_{101}$ becomes conductive, AGC of the video signal intermediate frequency amplifier circuit 2 is effected by said potential at B, that is, by output of the keyed AGC circuit 6.

According to the prior art system, for which AGC of the video signal intermediate frequency amplifier circuit 2 is effected only by the keyed AGC circuit, since the AGC potential for it varies as shown by the curve b in FIG. 3, video signals maintain a saturated state from the moment when the source is switched on to the intersection of the straight line a with the curve b, and becomes suddenly stabilized and thus the clamp pulse is set at its normal state at the intersection. Since the AGC function is effected by output of the keyed AGC circuit with gate processing by the clamp pulse, it takes a long time (e.g. about 1000 m sec until $t_2$ in FIG. 3) before the video signals are stabilized.

To the contrary, according to this invention, as mentioned above, the stabilization time is 100 m sec.

As explained above, according to this invention, the video signal stabilization time can be shortened to about 1/10 with respect to that obtained by the prior art keyed AGC system, and thus a remarkable practical effect can be obtained.

We claim:

1. AGC system for a television receiver comprising:
   a keyed AGC means and a peak or average AGC means disposed in parallel between an video signal intermediate frequency amplifier circuit and an video signal demodulating circuit in said television signal receiver; and
   a switching means connected between the outputs of said two AGC means;
   wherein said switching means turns on said keyed AGC means after having had said peak or average AGC means operated at the switch-on moment of the source of said television receiver.

2. AGC system according to claim 1, further comprising means supplying clamp pulses to said keyed AGC means.

* * * * *